No. 648,319. Patented Apr. 24, 1900.
W. H. WEIGHTMAN.
VAPORIZING, COOLING, AND REFINING APPARATUS.
(Application filed Apr. 4, 1899.)
(No Model.)
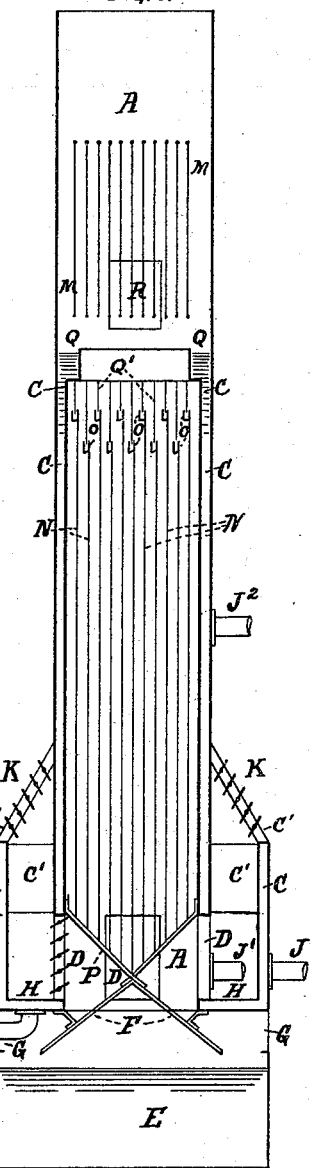
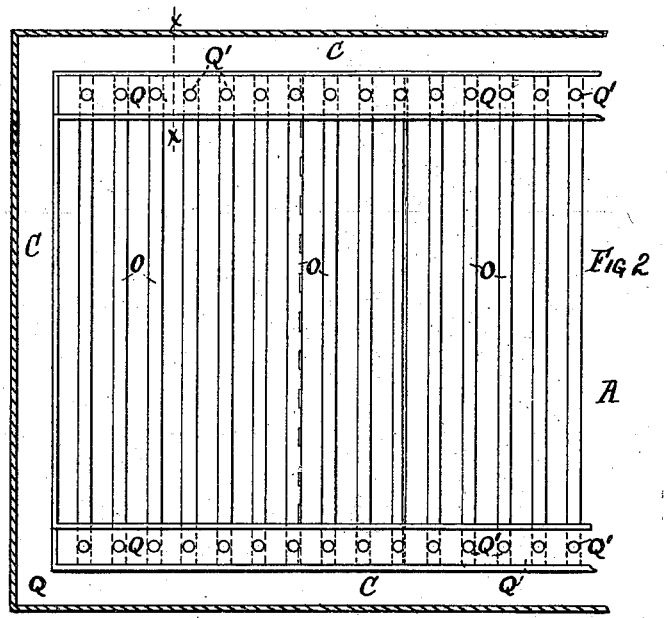
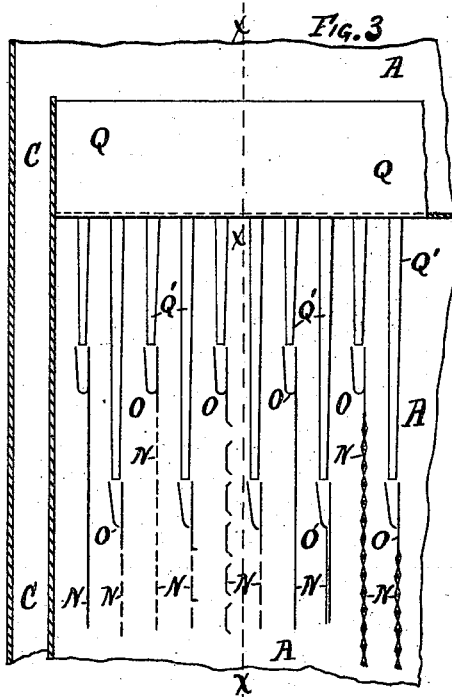
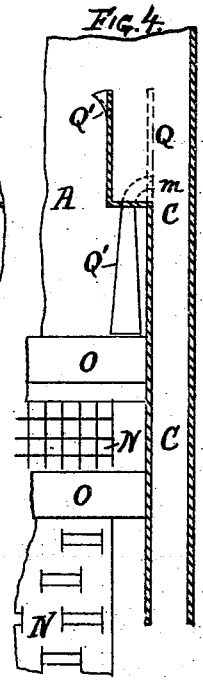
WITNESSES:
Spencer Aldrich.
H. L. Gorch.
INVENTOR
W. H. Weightman

UNITED STATES PATENT OFFICE.

WILLIAM H. WEIGHTMAN, OF NEW YORK, N. Y.

VAPORIZING, COOLING, AND REFINING APPARATUS.

SPECIFICATION forming part of Letters Patent No. 648,319, dated April 24, 1900.

Application filed April 4, 1899. Serial No. 711,669. (No model.)

*To all whom it may concern:*

Be it known that I, WILLIAM H. WEIGHTMAN, a citizen of the United States, residing in the city of New York, county of Kings, and State of New York, have invented certain new and useful Improvements in Vaporizing, Cooling, and Refining Apparatus, of which the following is a specification, reference being had to the accompanying drawings.

My invention relates to and has for its object the construction of a vaporizing heat extracting and disseminating apparatus for cooling and refining purposes wherein a controlled admission of vapor, atmospheric air, or similar fluid gases under a natural or enforced movement, circulation, or action is provided for as a cooling, changing, absorbing, or carrying medium, together with a maximum opportunity for the radiation, dispersion, and dissemination of any contained heat or of any undesirable qualities or qualifications the water, fluid, liquid, material, or substance to be acted upon or treated may contain.

Certain of my improvements consist in the provision of special means for effecting the exposure, uniform distribution, and dropping, showering, and sheeting of the waters, fluids, liquids, or substances to be treated and for effecting a contrary and opposing movement and distribution of the air, vapor, or fluid gases made use of, whereby the two shall mingle with, impinge upon, and pass by and over each other while moving through the several portions of the apparatus.

Other improvements consist in the construction of an inner upwardly-extending shaft-like compartment surrounding the same with a guard, fence, wall, or shield of less height or altitude projecting upward from the ground-floor or base-level of the apparatus and equally exposed to the atmosphere on both sides, over which a controlled, guarded, or natural flow of the air or cooling medium passes to the openings or passages at the lower end of said upwardly-extending compartment.

Other improvements consist in inclosing, forming, and partitioning said apparatus with walls in whole or in part hollow and watertight to provide a place into and within which the water, liquid, or material to be treated is entered and stored to finally overflow and move down the sides or walls or to enter pipes, ducts, ways, or distributers for further treatment, thereby exposing the same to a liberal opportunity for heat radiation, exposure, or dispensing surface before reaching the overflow, sheeting, showering, and downpour provided for.

Other improvements consist in the construction, arrangement, and combination within the upper portion of said compartment of one or more tiers of water, fluid, liquid, or material distributing reservoirs or ways, each of which is fed at one or both ends from the overflow of the hollow walls or partitions of the apparatus; also in preferably suspending from said reservoirs or ways drops, curtains, perforate sheets, or planes, down which by overflow perforations or slots the water, fluid, liquid, or material moves, while carefully preserving between said drops, curtains, sheets, and their associated ways or reservoirs a free, unhindered, and ready passage of the rising air, vapor, or fluid gases up through and out of the inner compartment as it becomes charged, saturated, and loaded with the vapor, heat, or material to be got rid of.

Other improvements consist in the special construction, arrangement, and combination of the several parts, portions, or details of the apparatus as may be hereinafter shown, described, and claimed.

In the drawings, Figure 1 represents a sectional elevation of a vaporizing, refining, or cooling apparatus embodying my improvements. Figs. 2 and 3 represent a detail sectional plan and elevation of the upwardly-extending compartment, embodying and showing a general arrangement of the overflow distributing reservoirs or ways and suspended drops, curtains, and perforated sheets or planes. Fig. 4 represents a cross-section on line $x\ x$ of Figs. 2 and 3, illustrating the relation between the hollow walls or partitions, the perforations, supply-pipes, ducts or mouths, and the distributing reservoirs or ways and the suspended drops, curtains, or perforated sheets.

Similar letters of reference designate like parts, portions, or details in all the figures.

Letter A designates an upwardly-extending inner compartment or shaft open at its top.

C designates walls or partitions, preferably made in whole or in part hollow and water-tight, to receive, contain, and securely hold until allowed to overflow the water, fluid, or material to be treated.

C' designates hollow and water-tight connections, braces, or partitions.

C² designates a surrounding guard, fence, wall, or shield, made hollow or solid, as preferred, and constructed to project upward from the ground floor or base-level of the apparatus and equally exposed on all surfaces to the atmosphere.

D designates openings or passages through the lower walls of compartment A.

Letter E designates a receiving tank, duct, or reservoir for containing or transmitting the results of the operations of the apparatus and into which all waters, liquids, or fluids dropping upon the bottom H, whether from operation, rain, vapor, or condensation, shall flow.

F designates a guard, pyramid, or scattering plate located to receive and spread the fall from the overflow, drops, curtains, or sheets. It may be perforated or constructed in separated planes arranged or divided to permit of a ready ventilation and the escape of any rising vapor or extraction from the surface of the contents below up through compartment A.

Letter G designates additional air-admission openings to assist in the elevation and circulation of the said rising vapor or extraction and the general operation of the plant or as a ventilator for tank E and its surroundings.

H designates a base or bottom made hollow in whole or in part and water-tight as a means of communication or circulation between the several walls or partitions.

I designates a discharge or cleaning blow-off or outlet.

J, J', and J² designate inlet connections, through which the water, fluid, liquid, or material is admitted to the hollow walls C, according to the extent or quantity of storage, exposure, or radiation desired. J designates a connection located to best supply all the walls, partitions, and connections. J' designates a connection located to best supply the walls, partitions, and connections of the inner compartment A, while J² designates a connection located to best supply more or less of the upper walls, partitions, or connections of the inner compartment A.

Letter K designates a series of openings closed or controlled by shutters, flaps, valves, or gates, through which the air, vapor, or operating medium is admitted by pressure or otherwise.

Letter N designates a plurality of suspended drops, curtains, sheets, or diaphragms made perforate or imperforate of wire-gauze or metallic lathing of woven or pendent material about, over, through, or down which the fluid, liquid, water, or material to be treated is passed by gravitation in sheets, drops, or surfaces best suited to a reliable contact, connection, or attrition with the upwardly-moving vapor, air, or fluid gases, according to the results desired.

Letter M designates special drops or curtains, similar to those designated by N, vertically suspended and arranged to attract, receive, and collect any water of condensation moving up between and through the several spaces formed thereby. Such water of condensation will move down by gravity to drop into the ways O or into the spaces between, as desired.

O designates a series of distributing reservoirs or ways by means of which the fluid, liquid, water, or material to be treated is distributed, showered, or sheeted into and down compartment A or upon or against the several suspended surface drops, curtains, falls, or diaphragms. Said distribution, showering, sheeting, or sprinkling is effected by means of overflows, slots, or perforations within or about the walls, bottoms, or joints of said ways or reservoirs as necessary according to the material or substance to be treated.

P designates cross bars, braces, or frames, to which the lower ends of the drops or diaphragms N are secured. They may, however, hang free at the bottom, if preferred. A preferred method, as illustrated in Fig. 1, is to suspend the drops N in graduated lengths to receive and guide the incoming air, vapor, or fluid gases evenly into the upward spaces between said drops N.

Letter Q designates an overflow at the upper end of and forming a part or portion with or, if desired, enlarged from the hollow walls C. If the hollow walls are dispensed with, this overflow may be fed direct from risers, pipes, or ducts. From the overflow the fluid or substance undergoing treatment passes steadily through minute perforations in the walls of said overflow Q for a continuous raining, showering, or sheeting down the several surfaces of said walls, or, as illustrated, through pipes, ducts, guides, or outlets Q' directly into compartment A or into secondary distributing ways or reservoirs O.

Letter R designates a manhole for access to compartment A.

The overflow Q may be made of any desired depth compatible with the fluid or material to be treated or of any width suitable to an upward circulation within and through compartment A or to outward overhang, and the outlets or perforations Q' may be located as desired to secure a continuous, nicely-regulated, and even distribution down through chamber or compartment A. To provide for this nicely-regulated and even distribution of the liquid, fluid, or material to the several distributing reservoirs or ways, and thence down through compartment A; the overflow portion Q is projected or extended bodily or by ducts, feeders, or passages to overhang the distributing ways or reservoirs O, the ducts, feeders, or passages Q', depended down to or within the overflow-levels of said distributing ways or reservoirs, securing an even head-pressure, a continuous, quiet, and even supply to each of the several distributing ways or reservoirs, and an even overflow down through all portions of compartment A independent of the drops, curtains, or diaphragms N.

Connections or partitions C' are of sufficient area and capacity to assure adequate circulation within and between the hollow portions of the walls or partitions forming the apparatus. They may be made use of as supports for any shutters, slides, gates, or valves for controlling the admission or pressure of air, vapor, or fluid gases to be made use of.

In the operation of the device as illustrated for the vaporizing and cooling of water the water to be treated is passed into and through the hollow water-tight walls C, thence through connections, partitions, and bottom C, C', and H to the walls C of the compartment A, whence it rises to the overflow locality at Q, the original admission being made at any suitable point or locality J. If only the walls of compartment A are to be used, admission may be made at any suitable point or locality J'. If only the upper walls of chamber or compartment A are to be used, admission may be had at any suitable point or locality, (indicated at J².) Meanwhile the contained heated water while passing through or stationary within the hollow walls C is radiating or giving out some portion of its heat through the surfaces of said walls and having reached the overflow elevation enters the outlet ducts, passages, or pipes at Q' and is discharged into the several distributing ways or reservoirs O to overflow or be squirted, sprayed, or showered upon or against the suspended drops, curtains, sheets, or diaphragms N, down and along which in a thin layer, screen, or sheet the fluid moves to give out its heat to the upwardly-moving air or vapor and to assist in the development of heat-absorbing vapor, manufactured or generated from the downpassing water or fluid, the same, with its heat, passing up and out through compartment A to the atmosphere. As the treated fluid or water approaches the lower ends of the drops or diaphragms N it may pass directly to the reservoir E or to the guard or scattering plate F, flowing into reservoir or duct E for disposal and use. As a means for effecting the circulation necessary to an upward movement and carrying off of the results of the cooling, vaporizing, treating, and refining a quantity of air, vapor, or fluid gases is admitted under ordinary atmospheric or wind circulation through overhead openings formed by the walls, partitions, or connections and passes downwardly to and through openings or passages D and up through compartment A, as through an air-shaft or chimney, such movement being effected through wind-pressure and through the differences in density of the outer and inner masses of air, vapors, or temperature developments. The guard fence, wall, or shield C² is preferably made use of as a means for a quiet and uniform entrance of the air, vapor, or gases to compartment A; but said walls may, if desired, be omitted and admission taken directly through openings or passages D, using the deflectors, gates, or valves according to necessity in atmospheric or pressure use. With the said guard fence, wall, or shield omitted the outer air or wind will tend in whole or in part, according to its strength, pressure, and speed of movement, to pass directly and horizontally through and across the lower end of compartment or shaft A without moving upward. The inlet-openings D on the several sides of said compartment or shaft are located at its lower end for the same reason. The whole apparatus is best located and operated in a free exposure to wind, air, and atmospheric forces and changes and preferably at an elevation where such forces and changes are best experienced.

The leading features of this apparatus are the radiation of heat from the water through the surfaces and sidings of the hollow walls and partitions inclosing the substance, material, or fluid to be treated, the absorption of a portion of this internal radiation by the admitted air, vapor, or fluid gases in their passage to, through, and up the compartment A and up and along the exposed surfaces of the several downwardly-moving water-surfaces, and the absorption and assimilation of a further portion of the heat by the development or formation of vapors from the liquid or fluid treated through the evaporation and sacrifice of some minimum portion of the water or fluid treated in the interest of an economical and timely operation of the plant.

Various methods for controlling the overflow, some of the simpler of which are illustrated in the drawings, may be used according to requirements. The overhanging portion of Q is preferable to an individual overhang of the pipes themselves with elbows or bends, as shown, and may be the more readily cleaned. It may have a series of pitcher-mouths, overflows, or projections supplying each its own reservoir.

To provide for a close arrangement of the drops, curtains, falls, or diaphragms and an open passage by and between the distributing ways or reservoirs, to which said drops, curtains, falls, or diaphragms N are preferably and directly attached, the distributing ways or reservoirs O are arranged in a plurality of tiers or rows and are staggered, so that no one of the distributing-reservoirs is directly below another. In the drawings two rows or tiers are shown. A greater number may be used.

What I claim as new, and desire to secure by Letters Patent, is—

1. The combination with a cooling apparatus of the character herein set forth, of a surrounding guard adapted to receive wind-pressure and over which it flows, drops and enters the passages of said cooling apparatus located below the top edge of said guard.

2. The combination with a cooling apparatus of the character herein set forth, of a series of distributing-reservoirs, an overflow projected to overhang said distributing-reservoirs, and a series of ducts, feeders or passages dependent from said overflow and reaching down to or within the overflow-levels of said distributing-reservoirs.

3. The combination in a cooling apparatus of the character herein set forth, of an upwardly-extending compartment or shaft, the inclosing walls of which are constructed of heat-radiating material and are made hollow and water-tight and contain the liquid to be cooled, an overflow at the upper portion of said hollow walls for the discharge of said fluid, whereby the fluid is distributed for exposure to the atmosphere.

4. The combination in a cooling apparatus of the character herein set forth, of a surrounding guard adapted to receive wind-pressure and over which it flows, drops and enters the passages of said cooling apparatus located below the top edge of said guard, a connecting base or floor between the said surrounding guard and the walls of the upwardly-extending compartment or shaft, and openings or passages within the lower walls of said compartment or shaft.

5. The combination in a cooling apparatus of the character herein set forth, of an upwardly-extending compartment or shaft, an overflow about the sides or walls of said upwardly-extending compartment or shaft, a plurality of rows or tiers of distributing-reservoirs, said distributing-reservoirs being so staggered that no one reservoir shall be directly beneath or can receive the overflow of the reservoirs at higher levels, and a series of ducts, feeders or passages dependent from said overflow and reaching down to or within the overflow-levels of said distributing-reservoirs.

6. The combination in a cooling apparatus of the character herein set forth, of an upwardly-extending compartment or shaft, an overflow about the sides or walls of said upwardly-extending compartment or shaft, a plurality of rows or tiers of distributing-reservoirs, said distributing-reservoirs being so staggered that no one reservoir shall be directly beneath or can receive the overflow of the reservoirs at higher levels, a series of ducts, feeders or passages dependent from said overflow and reaching down to or within the overflow-levels of said distributing-reservoirs and suspended drops, curtains or diaphrams down which the overflow is distributed.

7. The combination in a cooling apparatus of the character herein set forth, of an upwardly-extending compartment or shaft, an overflow about the sides or walls of said upwardly-extending compartment or shaft, a plurality of rows or tiers of distributing ways or reservoirs, said distributing-reservoirs being so staggered that no one reservoir shall be directly beneath or can receive the overflow of the reservoirs at higher levels, a series of ducts, feeders or passages dependent from said overflow and reaching down to or within the overflow-levels of said distributing-reservoirs, and suspended drops, curtains or diaphragms down which the overflow is distributed of graduated lengths to extend down to, in front of and past the admission openings or passages of the upwardly-extending compartment or shaft.

8. The combination in a cooling apparatus of the character herein set forth, the inclosing walls of which are constructed of heat-radiating material and are made hollow and water-tight and contain the liquid to be cooled, an overflow at the upper portion of said hollow walls for the discharge of said fluid, a plurality of rows or tiers of distributing-reservoirs, said distributing-reservoirs being so staggered that no one reservoir shall be directly beneath or can receive the overflow of the reservoirs at higher levels, a series of ducts, feeders or passages dependent from said overflow and reaching down to or within the overflow-levels of said distributing-reservoirs, and suspended drops, curtains or diaphragms down which the overflow is distributed.

9. The combination in a cooling apparatus of the character herein set forth, of an upwardly-extending compartment or shaft, a surrounding guard adapted to receive wind-pressure and over which it flows, drops and enters the admission-passages of said cooling apparatus located below the top edge of said guard; base or bottom flooring, walls, partitions, or braces connecting the main walls, all made hollow and water-tight and of heat-radiating material, and an overflow at the upper portion of said hollow walls for the discharge of the contained fluid.

10. The combination in a cooling apparatus of the character herein set forth, of an upwardly-extending compartment or shaft, a surrounding guard adapted to receive wind-pressure and over which it flows, drops and enters the admission-passages of said cooling apparatus located below the top edge of said guard; openings or passages at the bottom of said upwardly-extending compartment or shaft and additional openings or passages below the level of said floor or base portion for the admission of air or cooling medium.

11. The combination in a cooling apparatus of the character herein set forth, of an upwardly-extending compartment or shaft, a surrounding guard adapted to receive wind-pressure and over which it flows, drops and enters the admission-passages of said cooling apparatus located below the top edge of said guard; base or bottom flooring connecting the walls of said compartment or shaft with those of the surrounding guard; openings or passages at the bottom of said compartment or shaft; additional openings or passages below the level of said floor or base portion for the admission of air or cooling medium, and a receiving tank, duct or reservoir located beneath said apparatus, for containing and transmitting the fluid resulting or draining from the apparatus in its operation.

12. The combination in a cooling apparatus of the character herein set forth, of an upwardly-extending compartment or shaft; an overflow about the sides or walls of said upwardly-extending compartment or shaft; a plurality of rows or tiers of distributing ways or reservoirs, said distributing-reservoirs being so staggered that no one reservoir shall be directly beneath or can receive the overflow of the reservoir at higher levels; a series of ducts, feeders or passages dependent from said overflow and reaching down to or within the overflow-levels of said distributing-reservoirs, suspended drops, curtains or diaphragms down which the overflow is distributed, and additional suspended drops, curtains or diaphragms located within said compartment or shaft above the level of said ways or reservoirs.

WILLIAM H. WEIGHTMAN.

Witnesses:
SPENCER ALDRICH,
H. G. PORCH.